United States Patent
Madduri et al.

(10) Patent No.: US 10,664,277 B2
(45) Date of Patent: May 26, 2020

(54) SYSTEMS, APPARATUSES AND METHODS FOR DUAL COMPLEX BY COMPLEX CONJUGATE MULTIPLY OF SIGNED WORDS

(71) Applicant: Intel Corporation, Santa Clara, CA (US)

(72) Inventors: Venkateswara Madduri, Austin, TX (US); Elmoustapha Ould-Ahmed-Vall, Chandler, AZ (US); Robert Valentine, Kiryat Tivon (IL); Jesus Corbal, King City, OR (US); Mark Charney, Lexington, MA (US)

(73) Assignee: Intel Corporation, Santa Clara, WA (US)

( * ) Notice: Subject to any disclaimer, the term of this patent is extended or adjusted under 35 U.S.C. 154(b) by 122 days.

(21) Appl. No.: 15/721,313

(22) Filed: Sep. 29, 2017

(65) Prior Publication Data

US 2019/0102191 A1   Apr. 4, 2019

(51) Int. Cl.
*G06F 9/30* (2018.01)

(52) U.S. Cl.
CPC ........ *G06F 9/30145* (2013.01); *G06F 9/3001* (2013.01); *G06F 9/30036* (2013.01); *G06F 9/30105* (2013.01)

(58) Field of Classification Search
None
See application file for complete search history.

(56) References Cited

U.S. PATENT DOCUMENTS

| 4,202,039 A | 5/1980 | Epenoy et al. |
| 4,937,775 A | 6/1990 | Engeler et al. |
| 5,170,370 A | 12/1992 | Lee et al. |

(Continued)

FOREIGN PATENT DOCUMENTS

| FR | 2793971 A1 | 11/2000 | |
| WO | WO-2013095552 A1 * | 6/2013 | ........... G06F 9/3001 |

OTHER PUBLICATIONS

'CSEP 590tv: Quantum Computing' by Dave Bacon, Jun. 29, 2005. (Year: 2005).*

(Continued)

*Primary Examiner* — Steven G Snyder
(74) *Attorney, Agent, or Firm* — Nicholson De Vos Webster & Elliott LLP

(57) ABSTRACT

Embodiments of systems, apparatuses, and methods for dual complex number by complex conjugate multiplication in a processor are described. For example, execution circuitry executes a decoded instruction to multiplex data values from a plurality of packed data element positions in the first and second packed data source operands to at least one multiplier circuit, the first and second packed data source operands including a plurality of pairs complex numbers, each pair of complex numbers including data values at shared packed data element positions in the first and second packed data source operands; calculate a real part and an imaginary part of a product of a first complex number and a complex conjugate of a second complex number; and store the real result to a first packed data element position in the destination operand and store the imaginary result to a second packed data element position in the destination operand.

14 Claims, 13 Drawing Sheets

(56) References Cited

U.S. PATENT DOCUMENTS

| | | | |
|---|---|---|---|
| 5,442,577 A | 8/1995 | Cohen | |
| 5,721,892 A | 2/1998 | Peleg et al. | |
| 5,880,985 A | 3/1999 | Makineni et al. | |
| 5,936,872 A * | 8/1999 | Fischer | G06F 7/4812 708/622 |
| 5,953,241 A | 9/1999 | Hansen et al. | |
| 5,983,253 A * | 11/1999 | Fischer | G06F 7/4812 708/300 |
| 6,058,408 A * | 5/2000 | Fischer | G06F 7/4812 708/322 |
| 6,237,016 B1 * | 5/2001 | Fischer | G06F 17/10 708/300 |
| 6,272,512 B1 | 8/2001 | Golliver et al. | |
| 6,366,937 B1 | 4/2002 | Shridhar et al. | |
| 6,385,634 B1 * | 5/2002 | Peleg | G06F 7/4812 708/490 |
| 6,470,370 B2 * | 10/2002 | Fischer | G06F 17/10 708/300 |
| 6,542,916 B1 | 4/2003 | Hinds et al. | |
| 6,609,140 B1 | 8/2003 | Greene | |
| 6,675,187 B1 | 1/2004 | Greenberger | |
| 6,823,353 B2 * | 11/2004 | Fischer | G06F 17/10 708/622 |
| 6,826,587 B1 | 11/2004 | Montalvo et al. | |
| 7,072,929 B2 * | 7/2006 | Pechanek | G06F 7/4812 708/622 |
| 7,219,212 B1 | 5/2007 | Sanghavi et al. | |
| 7,392,368 B2 * | 6/2008 | Khan | G06F 9/30014 712/22 |
| 7,424,594 B2 * | 9/2008 | Pitsianis | G06F 9/30032 712/212 |
| 7,546,329 B2 | 6/2009 | Taunton | |
| 7,546,330 B2 * | 6/2009 | Taunton | G06F 7/4812 708/511 |
| 7,555,514 B2 | 6/2009 | Pedersen et al. | |
| 7,593,978 B2 | 9/2009 | Schulte et al. | |
| 7,873,812 B1 | 1/2011 | Mimar | |
| 7,962,719 B2 * | 6/2011 | Pitsianis | G06F 9/30032 712/221 |
| 8,229,991 B2 | 7/2012 | Tran et al. | |
| 8,271,571 B2 * | 9/2012 | Matsuyama | G06F 7/5443 708/622 |
| 8,443,170 B2 | 5/2013 | Wilder et al. | |
| 8,458,442 B2 | 6/2013 | Eichenberger et al. | |
| 8,595,280 B2 | 11/2013 | Symes et al. | |
| 8,650,240 B2 | 2/2014 | Eichenberger et al. | |
| 8,904,152 B2 * | 12/2014 | Pitsianis | G06F 9/30032 710/2 |
| 9,015,354 B2 * | 4/2015 | Pitsianis | G06F 9/30032 708/622 |
| 9,104,510 B1 | 8/2015 | Rub et al. | |
| 9,118,631 B1 | 8/2015 | Yung et al. | |
| 9,411,583 B2 * | 8/2016 | Sair | G06F 9/3001 |
| 9,465,611 B2 * | 10/2016 | Taunton | G06F 9/30014 |
| 9,489,197 B2 | 11/2016 | Rahman et al. | |
| 9,519,460 B1 | 12/2016 | Farooqui et al. | |
| 9,778,905 B1 | 10/2017 | Walke et al. | |
| 9,910,671 B2 | 3/2018 | Li et al. | |
| 10,180,820 B2 | 1/2019 | Buchanan et al. | |
| 2002/0004809 A1 | 1/2002 | Golliver et al. | |
| 2002/0169813 A1 * | 11/2002 | Pechanek | G06F 7/4812 708/622 |
| 2003/0009502 A1 * | 1/2003 | Katayanagi | G06F 9/3001 708/622 |
| 2003/0014457 A1 | 1/2003 | Desai et al. | |
| 2003/0014458 A1 * | 1/2003 | Fischer | G06F 17/10 708/622 |
| 2003/0088601 A1 | 5/2003 | Pitsianis et al. | |
| 2004/0078404 A1 | 4/2004 | Macy et al. | |
| 2004/0117422 A1 * | 6/2004 | Debes | G06F 7/4812 708/523 |
| 2004/0210616 A1 | 10/2004 | Debes et al. | |
| 2004/0221137 A1 * | 11/2004 | Pitsianis | G06F 9/30032 712/205 |
| 2005/0071414 A1 | 3/2005 | Taunton | |
| 2005/0071415 A1 | 3/2005 | Taunton | |
| 2005/0172106 A1 | 8/2005 | Ford et al. | |
| 2005/0182813 A1 | 8/2005 | Cho et al. | |
| 2005/0193185 A1 | 9/2005 | Taunton et al. | |
| 2006/0015702 A1 | 1/2006 | Khan et al. | |
| 2007/0192399 A1 | 8/2007 | Krithivasan et al. | |
| 2007/0239968 A1 | 10/2007 | Moyer et al. | |
| 2008/0046704 A1 | 2/2008 | Tanaka et al. | |
| 2008/0270768 A1 | 10/2008 | Khan et al. | |
| 2008/0301414 A1 * | 12/2008 | Pitsianis | G06F 9/30032 712/221 |
| 2009/0055455 A1 | 2/2009 | Matsuyama et al. | |
| 2010/0274990 A1 | 10/2010 | Wilder et al. | |
| 2011/0225224 A1 * | 9/2011 | Pitsianis | G06F 9/30032 708/404 |
| 2012/0072704 A1 | 3/2012 | Johnson et al. | |
| 2012/0166511 A1 * | 6/2012 | Hiremath | G06F 7/4812 708/622 |
| 2012/0284464 A1 | 11/2012 | Padaki et al. | |
| 2012/0284487 A1 | 11/2012 | Saha et al. | |
| 2013/0262547 A1 * | 10/2013 | Peleg | G06F 7/4812 708/501 |
| 2013/0275731 A1 * | 10/2013 | Sair | G06F 9/3001 712/222 |
| 2014/0164733 A1 | 6/2014 | Jha et al. | |
| 2014/0189231 A1 | 7/2014 | Maydan et al. | |
| 2014/0304493 A1 | 10/2014 | Zhong et al. | |
| 2014/0379774 A1 | 12/2014 | Gupta et al. | |
| 2015/0019842 A1 * | 1/2015 | Rahman | G06F 9/3001 712/208 |
| 2015/0039856 A1 * | 2/2015 | Pitsianis | G06F 9/30032 712/12 |
| 2015/0143078 A1 | 5/2015 | Khan et al. | |
| 2015/0149744 A1 | 5/2015 | Pedersen et al. | |
| 2015/0339101 A1 | 11/2015 | Dupont et al. | |
| 2016/0179523 A1 | 6/2016 | Ould-Ahmed-Vall et al. | |
| 2016/0224514 A1 | 8/2016 | Moudgill et al. | |
| 2018/0095758 A1 | 4/2018 | Dubtsov et al. | |
| 2018/0113708 A1 | 4/2018 | Corbal et al. | |
| 2019/0102193 A1 | 4/2019 | Madduri et al. | |
| 2019/0163472 A1 | 5/2019 | Valentine et al. | |
| 2019/0163473 A1 | 5/2019 | Valentine et al. | |

OTHER PUBLICATIONS

'The complex conjugate' by mathcentre, 2009. (Year: 2009).*
'How do you find the product of 7-2i and its conjugate?' from Socratic, Dec. 24, 2015. (Year: 2015).*
"5.6. Negative Values—Two's Complement," CS160 Reader, archived from http://computerscience.chemeketa.edu on Jul. 2016, pp. 1-3.
Abu Taha M., et al., "A Practical One Way Hash Algorithm Based on Matrix Multiplication," International Journal of Computer Applications, vol. 23 (2), Jun. 2011, 5 pages.
Agrawal D.P., et al., "On Multiple Operand Addition of Signed Binary Numbers," IEEE Transactions on Computers, vol. c-27, No. 11, Nov. 1978, pp. 1068-1070.
Dolmatov V., et al., "GOST R 34.11-2012: Hash Function," Aug. 2013, 64 pages.
Final Office Action from U.S. Appl. No. 15/721,529, dated Mar. 21, 2019, 10 pages.
Final Office Action from U.S. Appl. No. 15/721,458, dated May 3, 2019, 17 pages.
Hamamreh R., et al., "Hash Algorithm for Data Integrity Based on Matrix Combination," The 14th International Arab Conference on Information Technology (ACIT'2013), Feb. 2014, 5 pages.
Hilewitz Y., et al., "Advanced Bit Manipulation Instruction Set Architecture," Princeton University, Nov. 2006, 17 pages.
Hilewitz Y., et al., "Bit matrix multiplication in commodity processors," 2008 International Conference on Application-Specific Systems, Architectures and Processors, 2008, pp. 7-12.
Mahajan N.V., et al., "Simple Computation of DIT FFT," International Journal of Advanced Research in Computer Science and Software Engineering, May 2014, vol. 4 (5), pp. 353-356.

(56) References Cited

OTHER PUBLICATIONS

Non-Final Office Action from U.S. Appl. No. 15/721,448, dated Jun. 19, 2019, 13 pages.
Non-Final Office Action from U.S. Appl. No. 15/721,448, dated Nov. 16, 2018, 17 pages.
Non-Final Office Action from U.S. Appl. No. 15/721,458, dated Dec. 5, 2018, 18 pages.
Non-Final Office Action from U.S. Appl. No. 15/721,529, dated Nov. 19, 2018, 10 pages.
Non-Final Office Action from U.S. Appl. No. 15/721,145, dated Apr. 4, 2019, 17 pages.
Non-Final Office Action from U.S. Appl. No. 15/721,261, dated Mar. 15, 2019, 10 pages.
Non-Final Office Action from U.S. Appl. No. 15/721,464, dated May 15, 2019, 22 pages.
Non-Final Office Action from U.S. Appl. No. 15/721,616, dated Mar. 21, 2019, 27 pages.
Non-Final Office Action from U.S. Appl. No. 15/721,627, dated Mar. 21, 2019, 27 pages.
Notice of Allowance from U.S. Appl. No. 15/721,412, dated Feb. 13, 2019, 8 pages.
Notice of Allowance from U.S. Appl. No. 15/721,459, dated Mar. 6, 2019, 5 pages.
Notice of Allowance from U.S. Appl. No. 15/721,459, dated Feb. 13, 2019, 9 pages.
Notice of Allowance from U.S. Appl. No. 15/721,599, dated Feb. 28, 2019, 8 pages.
Requirement for Restriction/Election from U.S. Appl. No. 15/721,225, dated Jan. 9, 2019, 6 pages.
Slade G.W., "The Fast Fourier Transform in Hardware: A Tutorial Based on an FPGA Implementation," Mar. 21, 2013, pp. 1-26.
Stack Overflow, "Binary Matrix Multiplication Bit Twiddling Hack," retrieved from http://stackoverflow.com/questions/18447321/binary-matrix-multiplication-bit-twiddling-hack, Aug. 26, 2013, 7 pages.
Van Amstel D., "Efficient and Scalable Bit-Matrix Multiplication in Bit-Slice Format;" ACM SAC 2012, Mar. 2012, 6 pages.
Van Zee F.G., et al., "Implementing High-Performance Complex Matrix Multiplication via the 3m and 4m Methods," ACM Transactions on Mathematical Software, 2016, pp. 0:1-0:36.
Y. Hilewitz, C. Lauradoux and R.B. Lee, "Bit matrix multiplication in commodity processors," 2008 International Conference on Application-Specific Systems, Architectures and Processors, pp. 7-12, 2008.
Notice of Allowance from U.S. Appl. No. 15/721,261, dated Nov. 12, 2019, 6 pages.
Notice of Allowance from U.S. Appl. No. 15/721,529, dated Sep. 5, 2019, 5 pages.
Notice of Allowance from U.S. Appl. No. 15/721,464, dated Aug. 29, 2019, 24 pages.
Notice of Allowance from U.S. Appl. No. 15/721,261, dated Aug. 14, 2019, 8 pages.
Non-Final Office Action from U.S. Appl. No. 15/721,225, dated Aug. 13, 2019, 20 pages.
Final Office Action from U.S. Appl. No. 15/721,627, dated Oct. 28, 2019, 29 pages.
Final Office Action from U.S. Appl. No. 15/721,616, dated Oct. 28, 2019, 28 pages.
Ex Parte Quayle Action from U.S. Appl. No. 15/721,145, Sep. 6, 2019, 9 pages.

* cited by examiner

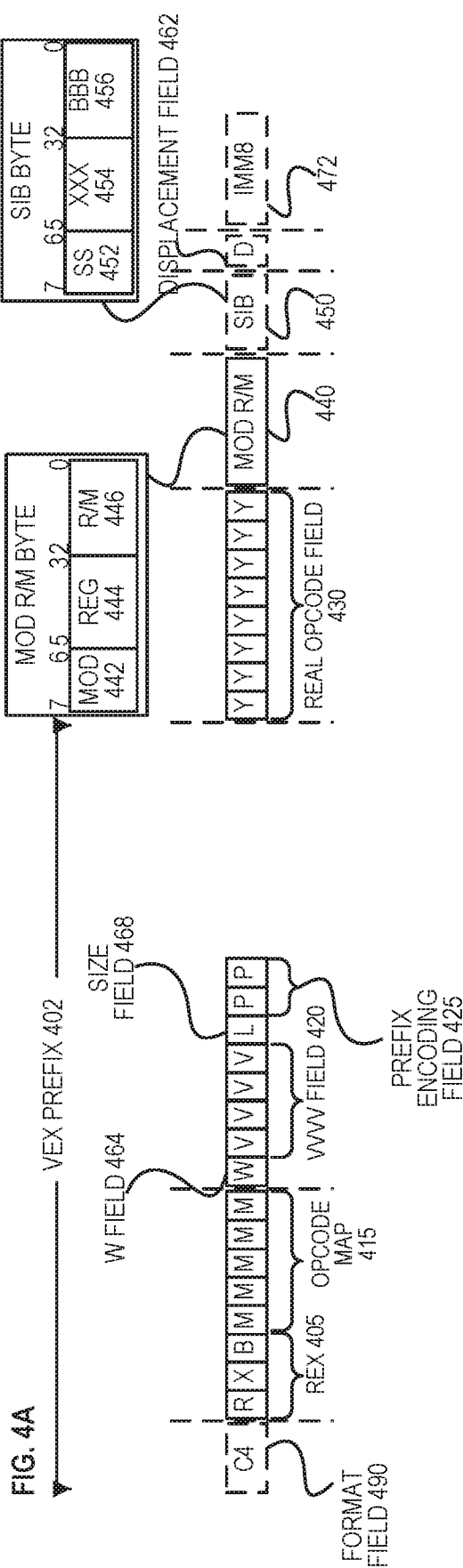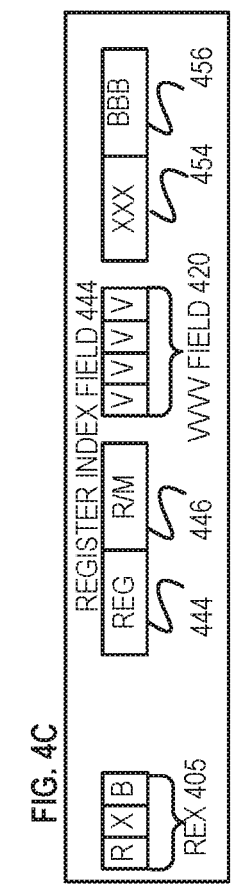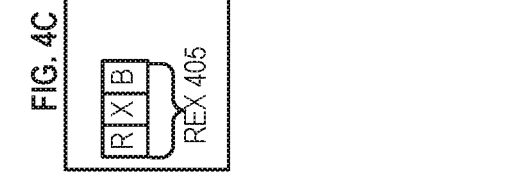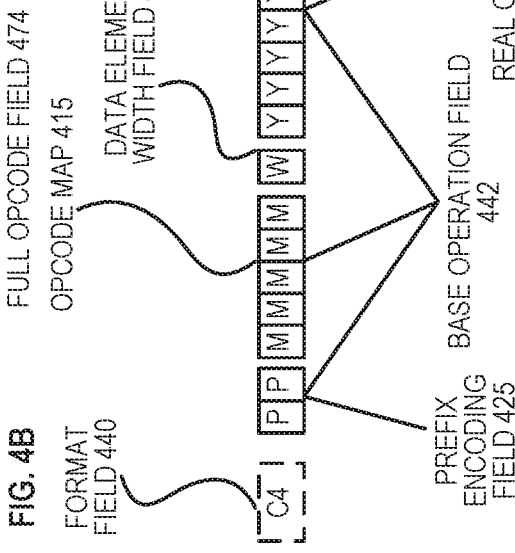

FIG. 5
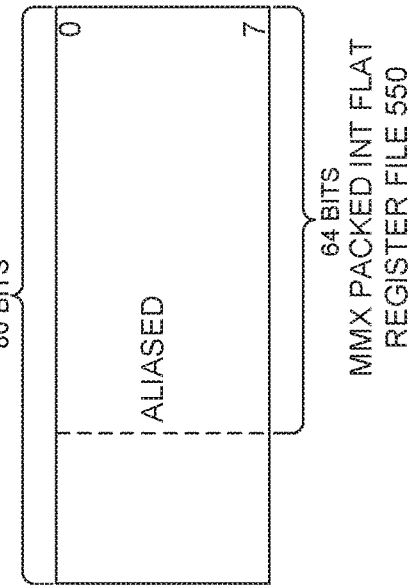
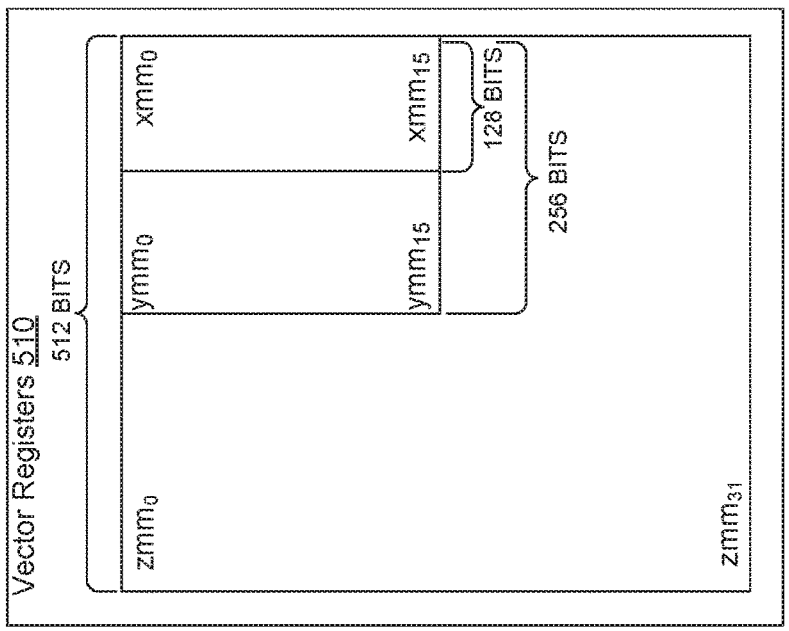

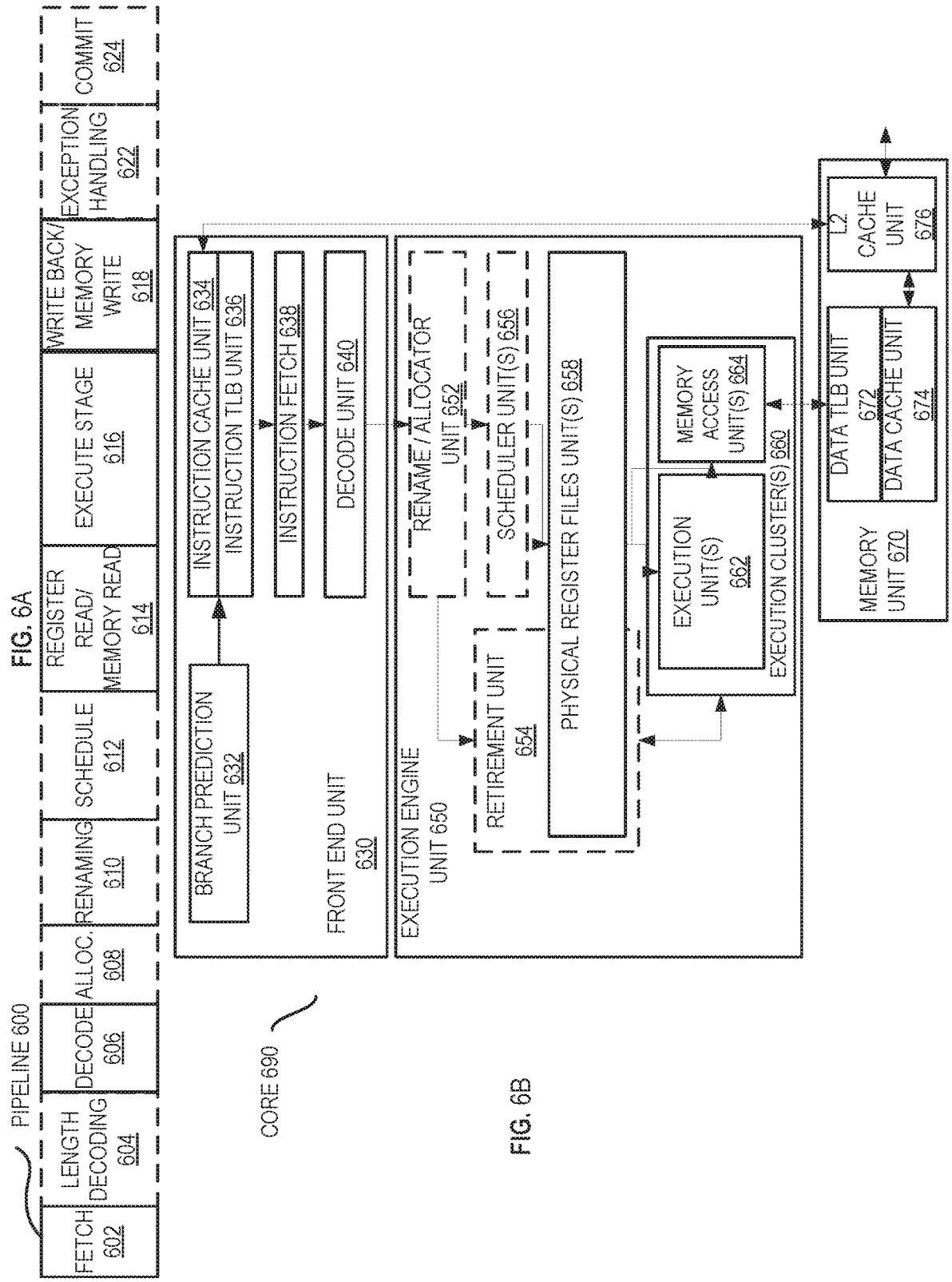

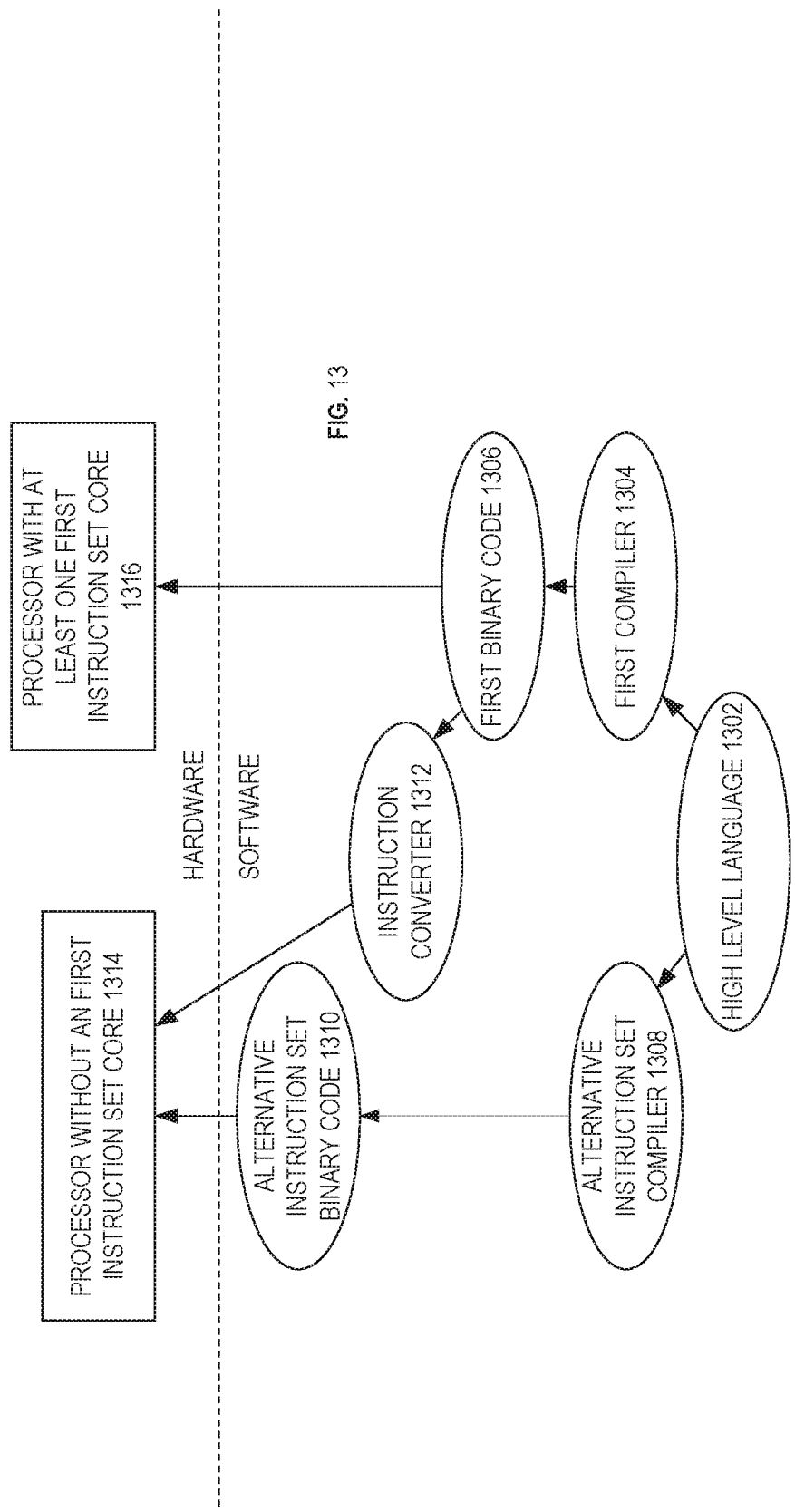

SYSTEMS, APPARATUSES AND METHODS FOR DUAL COMPLEX BY COMPLEX CONJUGATE MULTIPLY OF SIGNED WORDS

FIELD OF INVENTION

The field of invention relates generally to computer processor architecture, and, more specifically, to instructions which when executed cause a particular result.

BACKGROUND

Applications, such as digital signal processing applications, perform various operations on complex vectors that perform filtering, post processing, and other functions. These operations, such as arithmetic calculations, saturation, etc., on both the real and imaginary portions of the complex vectors, typically require sequences of instructions to be performed. This leads to lower performance, as these sequences of instructions are run for each operation.

BRIEF DESCRIPTION OF THE DRAWINGS

The present invention is illustrated by way of example and not limitation in the figures of the accompanying drawings, in which like references indicate similar elements and in which:

FIG. 4A is a block diagram illustrating an exemplary specific vector friendly instruction format according to embodiments of the invention;

FIG. 4B is a block diagram illustrating the fields of the specific vector friendly instruction format that make up the full opcode field according to one embodiment of the invention;

FIG. 4C is a block diagram illustrating the fields of the specific vector friendly instruction format that make up the register index field according to one embodiment of the invention;

FIG. 5 is a block diagram of a register architecture according to one embodiment of the invention;

FIG. 6A is a block diagram illustrating both an exemplary in-order pipeline and an exemplary register renaming, out-of-order issue/execution pipeline according to embodiments of the invention;

FIG. 6B is a block diagram illustrating both an exemplary embodiment of an in-order architecture core and an exemplary register renaming, out-of-order issue/execution architecture core to be included in a processor according to embodiments of the invention;

FIG. 13 is a block diagram contrasting the use of a software instruction converter to convert binary instructions in a source instruction set to binary instructions in a target instruction set according to embodiments of the invention.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The complex vector operations discussed above previously required sequences of instructions to be executed to generate the desired output. This included, e.g., operations to separately perform complex by complex conjugate multiplication. Embodiments disclose an instruction to perform dual complex by complex conjugate multiplication on complex data in quadwords of vector source registers.

Detailed herein are embodiments of a dual complex by complex conjugate multiply instruction to improve a computer itself by speeding up (and therefore typically using less power) than performing a plurality of operations to perform dual complex by complex multiplication. The execution of the instruction causes an execution circuit (execution unit) to perform complex multiplication on source data. In some embodiments, the execution of a dual complex by complex conjugate multiply instruction causes an execution circuit to multiplex data values from a plurality of packed data element positions in the first and second packed data source operands to at least one multiplier circuit, the first and second packed data source operands including a plurality of pairs complex numbers, each pair of complex numbers including data values at shared packed data element positions in the first and second packed data source operands, calculate a real part and an imaginary part of a product of a first complex number and the complex conjugate of a second complex number, and output the real part and the imaginary part of the product of each pair of complex numbers to an adder network to calculate the real result and the imaginary result, and store the real result to a first packed data element position in the destination operand and store the imaginary result to a second packed data element position in the destination operand.

Figure 1:
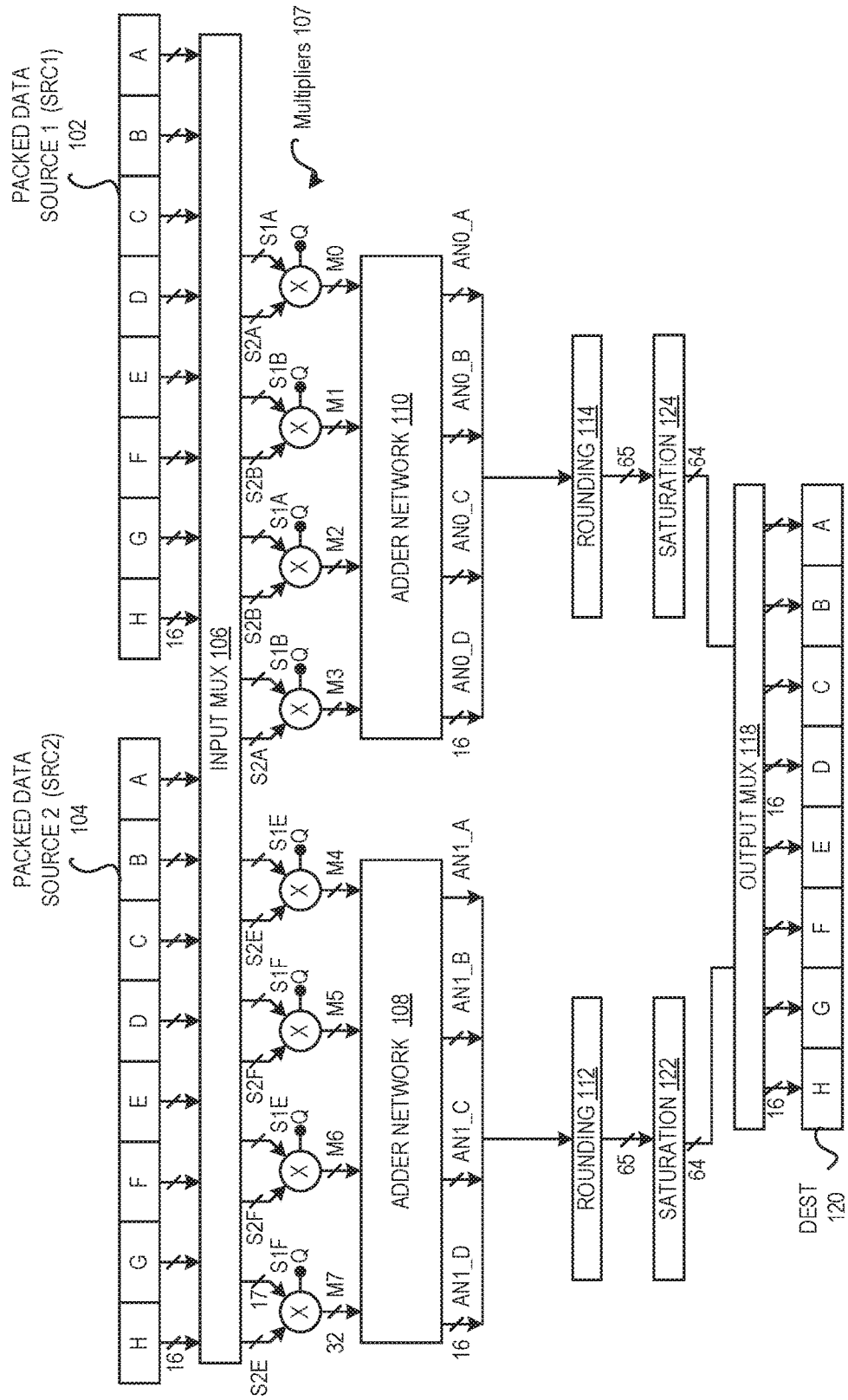
FIG. 1 illustrates an exemplary execution of a dual complex by complex conjugate multiply instruction.

FIG. 1 illustrates an exemplary execution of a dual complex by complex conjugate multiply instruction. The dual complex multiply add instruction format includes fields for a destination (packed data destination (DST) 120) and two sources (vector packed data source 1 (SRC1) 102 and vector packed data source 2 (SRC2) 104). For example, SRC1 102 and SRC2 104 can each include values for two complex numbers, where each complex number is a double word (e.g., A+Bi, E+Fi, etc.). The instruction is for multiplying complex numbers stored in SRC1 102 and SRC2 104 by the complex conjugates of complex numbers stored in SRC1 102 and SRC2 104. In some embodiments, the resulting values may be rounded, such as through truncation, convergent, or round-up operations.

Packed data source 1 102 includes eight packed data elements (shown at packed data element positions A-H). Depending upon the implementation, vector packed data source 2\1 102 is a packed data register (e.g., a XMM, YMM, ZMM, vector, SIMD, D, S, etc. register), or a memory location.

Packed data source 2 104 includes eight packed data elements (shown at packed data element positions A-H). Depending upon the implementation, packed data source 2 104 is a packed data register (e.g., a XMM, YMM, ZMM, vector, SIMD, D, S, etc. register), or a memory location.

The two packed data sources 102, 104 are fed into execution circuitry to be operated on. As shown, the execution circuitry can include an input mux 106 which pass the values from the packed data sources 102, 104 to a plurality of multipliers 107. As discussed, the values of corresponding complex numbers (e.g., S1(A) and S1(B), etc.) are multiplied. The following is an example of complex number by complex conjugate multiplication:

$$(x+yi)(u-vi)=(xu+yv)+(-xu+yu)i$$

As applied to the complex numbers stored in vector packed data sources SRC2 102 and SRC3 104, such complex multiplication may be represented as:

$$(S1A+S1Bi)(S2A-S2Bi)=(S2A*S1A+S2B*S1B)+(-S2B*S1A+S2A*S1B)i$$

The multipliers 107 can perform vector multiplication of the data sources 102, 104. In some embodiments, each input value may be a signed value. As shown in FIG. 1, the multipliers 107 can generate the following values: S2A*S1A; S2B*S1B; S2B*S1A; S2A*S1B; S2E*S1E; S2F*S1F; S2F*S1E; and S2E*S1F. Note while a plurality of multipliers is shown, in some embodiments, the same multiplier is reused. In some embodiments, the order of the operands can be SRC2[ ]×SRC1[ ], where SRC2[ ] is the complex number taken from SRC2 104 and SRC1[ ] is the complex number taken from SRC1 102. In various embodiments, subtraction and signed addition can be performed on the 32-bit multiplier outputs.

In the embodiment shown in FIG. 1, adder networks 108, 110 can combine the outputs of multipliers 107 to calculate the real and imaginary parts of dual complex number by complex conjugate complex number multiplication. As such, the dual complex multiply add instruction calculates a first product of a first complex number and a complex conjugate of a second complex number. Each complex number includes a real part and an imaginary part. In some embodiments, each real part and imaginary part may be a 16-bit word stored in consecutive data element positions in the source operands. Each pair of complex numbers may include a complex number from the same data element positions in each source operand. For example, in the embodiment of FIG. 1, a first pair of complex numbers may include a first complex number stored at S1A (real part) and S1B (imaginary part) and a second complex number stored at S2A (real part) and S2B (imaginary part). Similarly, a second pair of complex numbers may be at S1E/S1F and S2E/S2F. In some embodiments, a third pair of complex numbers at S1C/S1D and S2C/S2D, and a fourth pair of complex numbers at S1G/S1H and S2G/S2H. When the dual complex by complex conjugate multiply instruction is executed, the sum of the products of the first and second pairs of complex numbers can be calculated, for example:

$$(S1A+S1Bi)(S2A-S2Bi)=(S2A*S1A+S2B*S1B)+(-S2B*S1A+S2A*S1B)i$$

$$(S1E+S1Fi)(S2E-S2Fi)=(S2E*S1E+S2F*S1F)+(-S2F*S1E+S2E*S1F)i$$

A pseudocode representation of this is shown below:

```
TEMP0[32:0] ← ((SRC1[15:0] * SRC2[15:0]) + (SRC1[31:16] * SRC2[31:16])); (* Real Number *)
TEMP1[32:0] ← ((SRC1[15:0] * SRC2[31:16]) - (SRC1[31:16] * SRC2[15:0])); (* Imaginary Number *)
TEMP2[32:0] ← ((SRC1[79:64] * SRC2[79:64]) + (SRC1[95:80] * SRC2[95:80])); (* Real Number *)
TEMP3[32:0] ← ((SRC1[79:64] * SRC2[95:80]) - (SRC1[95:80] * SRC2[79:64])); (* Imaginary Number *)
DEST[15:0]  ← RoundSaturatePosToSignedWord (TEMP0[32:0], MXCSR.IRM[1:0], DEST[15:0]);
DEST[31:16] ← RoundSaturatePosToSignedWord (TEMP1[32:0], MXCSR.IRM[1:0], DEST[31:16]);
DEST[79:64] ← RoundSaturatePosToSignedWord (TEMP2[32:0], MXCSR.IRM[1:0], DEST[79:64]);
DEST[95:80] ← RoundSaturatePosToSignedWord (TEMP3[32:0], MXCSR.IRM[1:0], DEST[95:80]).
```

As shown above, a first temporary register (TEMP0) can store the real part of the complex by complex conjugate multiplication and a second temporary register (TEMP1) can store the imaginary part (e.g., where SRC1[15:0] corresponds to element A, SRC1[31:16] corresponds to element B of SRC1 102, and similarly for SRC2). Similarly, a third temporary register (TEMP2) can store the real part and a fourth temporary register (TEMP5) of the complex by complex conjugate multiplication for a second pair of complex (e.g., where SRC1[79:64] corresponds to element E, and SRC1[95:80] corresponds to element F of SRC1 102, and similarly for SRC2).

In some embodiments, each resulting value stored on one of the temporary registers may be rounded and saturated prior to storing the value in the destination. As shown in the above pseudocode representation, a rounding operation may be performed on the value stored in a temporary register before the value is stored to the destination. The rounding operation may receive one or more control bit inputs which can be used to determine which rounding operation is to be performed. For example, as shown in the following pseudocode representation, a truncation, round-up, or convergent rounding operation may be performed based on the one or more control bits (e.g., MXCSR.IRM[1:0]). Depending on the value of the rounded result, the destination may be saturated to the maximum positive value, or the value of the rounded result may be stored to the destination. As shown in FIG. 1, rounding as described above may be performed by rounding circuits 112, 114. In some embodiments, saturation circuits 122, 124 may perform the saturation described above before the results are stored to the vector packed data destination, for example, as shown in the following pseudo-code representation:

```
RoundSaturatePosToSignedWord(SRC[32:0], MXCSR.IRM[1:0],
DEST[15:0])
IF (MXCSR.IRM[1:0] == 2'b11) THEN (* Truncate *)
    TEMP_RoundBit ← 1'b0;
ELSE IF (MXCSR.IRM[1:0] == 2'b10) THEN (* Round Up *)
    TEMP_RoundBit ← SRC[15];
ELSE (* Convergent Rounding *)
    TEMP_RoundBit ← (SRC[15:0] == 0x8000) ? SRC[16] : SRC[15];
TEMP0[16:0] ← (SRC[32:16] + TEMP_RoundBit); (* Add Rounding
bit and wrap *)
IF (TEMP0[16] == 1'b0) AND (TEMP0[15] == 1'b1)
    DEST[15:0] ← 0x7FFF; (* Saturate to Max. Positive *)
    MXCSR.Sat ← 1;
ELSE
    DEST[15:0] ← TEMP0[15:0];
```

In some embodiments, the instruction may be implemented as two micro-operations (e.g., one for lower quad words and one for upper quad words. The above described operations may represent a first micro-operation to perform complex by complex conjugate multiplication for two pairs of complex numbers (A+Bi and E+Fi, from each source register). In some embodiments, a second micro-operation may perform complex conjugate multiplication for two additional pairs of complex numbers (C+Di and G+Hi, from each source register). A pseudocode representation of this second micro-operation is shown below:

```
TEMP4[32:0] ← ((SRC1[47:32] * SRC2[47:32]) + (SRC1[63:48] * SRC2[63:48])); (* Real Number *)
TEMP5[32:0] ← ((SRC1[47:32] * SRC2[63:48]) − (SRC1[63:48] * SRC2[47:32])); (* Imaginary Number *)
TEMP6[32:0] ← ((SRC1[111:96] * SRC2[111:96]) + (SRC1[127:112] * SRC2[127:112])); (* Real Number *)
TEMP7[32:0] ← ((SRC1[111:96] * SRC2[127:112]) − (SRC1[127:112]* SRC2[111:96])); (* Imaginary
Number *)
DEST[47:32] ← RoundSaturatePosToSignedWord(TEMP4[32:0], MXCSR.IRM[1:0], DEST[47:32]);
DEST[63:48] ← RoundSaturatePosToSignedWord(TEMP5[32:0], MXCSR.IRM[1:0], DEST[63:48]);
DEST[111:96] ← RoundSaturatePosToSignedWord (TEMP6[32:0], MXCSR.IRM[1:0], DEST[111:96]);
DEST[127:112] ← RoundSaturatePosToSignedWord (TEMP7[32:0], MXCSR.IRM[1:0],DEST[127:112]).
```

As shown above, a fifth temporary register (TEMP4) can store the real part of the complex by complex conjugate multiplication and a sixth temporary register (TEMP5) can store the imaginary part (e.g., where SRC1[47:32] corresponds to element C, SRC1[63:48] corresponds to element D of SRC1 102, and similarly for SRC2). Similarly, a seventh temporary register (TEMP6) can store the real part and an eighth temporary register (TEMP7) of the complex by complex conjugate multiplication for a second pair of complex (e.g., where SRC1[111:96] corresponds to element G, and SRC1[127:112] corresponds to element H of SRC1 102, and similarly for SRC2). In some embodiments, rounding may be performed on the resulting values as discussed above, prior to storing the results to the destination 120.

Each of the 16-bit real and imaginary outputs from the saturation units 122, 124 are stored in the destination register. Depending upon the implementation, packed data source 1/destination 120 is a packed data register (e.g., a XMM, YMM, ZMM, vector, SIMD, D, S, etc. register), or a memory location.

In some embodiments, adder networks 108 and 110 can perform subtraction and signed addition on the outputs of the multipliers 107 to calculate the real and imaginary results, as shown above. For example, the value of S2A*S1A may be stored in a first temporary register and the value of S2B*S1B may be stored in a second temporary register. A signed addition function may be used to add these values and store the resulting value which represents the real part of the complex by complex conjugate product in a third temporary register. In some embodiments, signed addition may be performed by sign extending the value in the first and second temporary registers and then adding the sign extended values and storing the results to the third temporary register. Similarly, subtraction may be performed to calculate the imaginary part of the complex by complex conjugate product. For example, the value of −S2B*S1A and the value of S2A*S1B may be stored in a first and second temporary register, respectively. The 2's complement of the value of the second temporary register can be determined and stored in a third temporary register. The values of the first temporary register and the third temporary may then be added (e.g., using unsigned addition) and the result stored to a destination.

Figure 2:
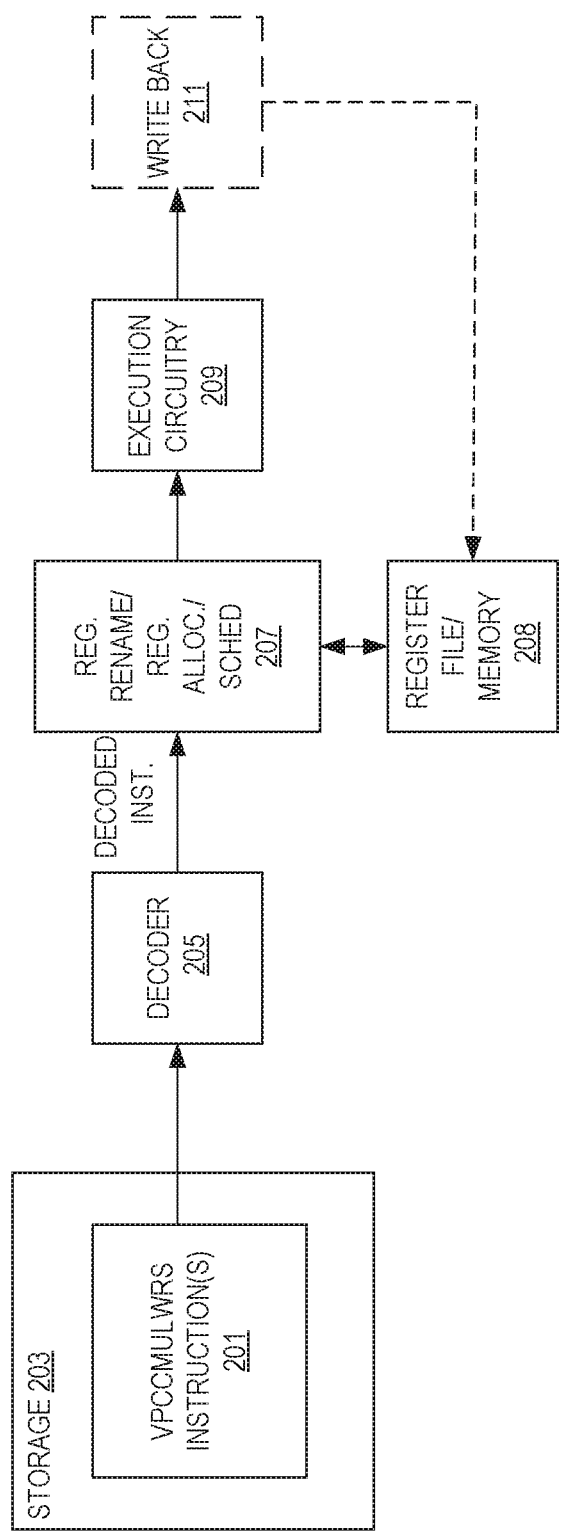
FIG. 2 illustrates an embodiment of hardware to process an instruction such as a dual complex by complex conjugate multiply instruction.

FIG. 2 illustrates an embodiment of hardware to process instructions such as a dual complex by complex conjugate multiply instructions. As illustrated, storage 201 stores dual complex multiply add instructions 201 to be executed.

Each instruction is received by decode circuitry 205. For example, the decode circuitry 205 receives this instruction from fetch logic/circuitry. The instruction 201 includes fields for an opcode, first and second sources, and a destination. In some embodiments, the sources and destination are registers, and in other embodiments one or more are memory locations. More detailed embodiments of at least one instruction format will be detailed later. The decode circuitry 205 decodes the instruction into one or more operations. In some embodiments, this decoding includes generating a plurality of micro-operations to be performed by execution circuitry (such as execution circuitry 209). The decode circuitry 205 also decodes instruction prefixes.

In some embodiments, register renaming, register allocation, and/or scheduling circuitry 207 provides functionality for one or more of: 1) renaming logical operand values to physical operand values (e.g., a register alias table in some embodiments), 2) allocating status bits and flags to the decoded instruction, and 2) scheduling the decoded instruction for execution on execution circuitry out of an instruction pool (e.g., using a reservation station in some embodiments).

Registers (register file) and/or memory 208 store data as operands of the instruction to be operated on by execution circuitry. Exemplary register types include packed data registers, general purpose registers, and floating point registers.

Execution circuitry executes 209 the decoded instruction. Exemplary detailed execution circuitry was shown in FIGS. 1 and 2. The execution of the decoded instruction causes the execution circuitry to perform dual complex multiplication and addition of the real or imaginary parts of source complex numbers. In some embodiments, the execution of a decoded dual complex multiply add instruction causes an execution circuit to multiplex data values from a plurality of packed data element positions in the first and second packed data source operands to at least one multiplier circuit, the first and second packed data source operands including a plurality of pairs complex numbers, each pair of complex numbers including data values at shared packed data element positions in the first and second packed data source operands, calculate an real part of a product of each pair of complex numbers and output the real part of the product of each pair of complex numbers to an adder network, add the real part of the product of a first pair of complex numbers to the real part of the product of a second pair of complex numbers to calculate a first real result, and add the real part of the product of a third pair of complex numbers to the real part of the product of a fourth pair of complex numbers to calculate a second real result, and store the first real result to a first packed data element position in the destination operand and store the second real result to a second packed data element position in the destination operand.

Write back (retirement) circuitry 211 commits the result of the execution of the decoded instruction.

In some embodiments, retirement/write back circuitry architecturally commits the destination register into the registers or memory and retires the instruction.

An embodiment of a format for a dual complex by complex conjugate multiply instruction is VPCCMULWRS DSTREG, SRC1, SRC2. In some embodiments, VPCCMULWRS {B/W/D/Q} is the opcode mnemonic of the instruction. DSTREG is a field for the packed data destination register operand. SRC1 and SRC2 are fields for the sources such as packed data registers and/or memory. In some embodiments, the instructions can be VEX encoded. In some embodiments, SRC1 may be a "vvvv" value (such as 420), and in some embodiments, SRC2 may be a R/M value (such as 446), as discussed further with respect to FIG. 4.

In some embodiments, the dual complex by complex conjugate multiply instructions include VPCCMULWRS DESTR, SRC1, SRC2 (which performs dual complex by complex conjugate multiply on input complex numbers). A writemask is used to conditionally control per-element operations and updating of results. Depending upon the implementation, the writemask uses merging or zeroing masking. Instructions encoded with a predicate (writemask, write mask, or k register) operand use that operand to conditionally control per-element computational operation and updating of result to the destination operand. The predicate operand is known as the opmask (writemask) register. In some embodiments, the opmask is a set of architectural registers of size 64-bit. Note that from this set of architectural registers, only k1 through k7 can be addressed as predicate operand. k0 can be used as a regular source or destination but cannot be encoded as a predicate operand. Note also that a predicate operand can be used to enable memory fault-suppression for some instructions with a memory operand (source or destination). As a predicate operand, the opmask registers contain one bit to govern the operation/update to each data element of a vector register. In general, opmask registers can support instructions with element sizes: single-precision floating-point (float32), integer doubleword(int32), double-precision floating-point (float64), integer quadword (int64). The length of a opmask register, MAX_KL, is sufficient to handle up to 64 elements with one bit per element, i.e. 64 bits. For a given vector length, each instruction accesses only the number of least significant mask bits that are needed based on its data type. An opmask register affects an instruction at per-element granularity. So, any numeric or non-numeric operation of each data element and per-element updates of intermediate results to the destination operand are predicated on the corresponding bit of the opmask register. In most embodiments, an opmask serving as a predicate operand obeys the following properties: 1) the instruction's operation is not performed for an element if the corresponding opmask bit is not set (this implies that no exception or violation can be caused by an operation on a masked-off element, and consequently, no exception flag is updated as a result of a masked-off operation); 2). a destination element is not updated with the result of the operation if the corresponding writemask bit is not set. Instead, the destination element value must be preserved (merging-masking) or it must be zeroed out (zeroing-masking); 3) for some instructions with a memory operand, memory faults are suppressed for elements with a mask bit of 0. Note that this feature provides a versatile construct to implement control-flow predication as the mask in effect provides a merging behavior for vector register destinations. As an alternative the masking can be used for zeroing instead of merging, so that the masked out elements are updated with 0 instead of preserving the old value. The zeroing behavior is provided to remove the implicit dependency on the old value when it is not needed.

In embodiments, encodings of the instruction include a scale-index-base (SIB) type memory addressing operand that indirectly identifies multiple indexed destination locations in memory. In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x,y,z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x,y,z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

Figure 3:
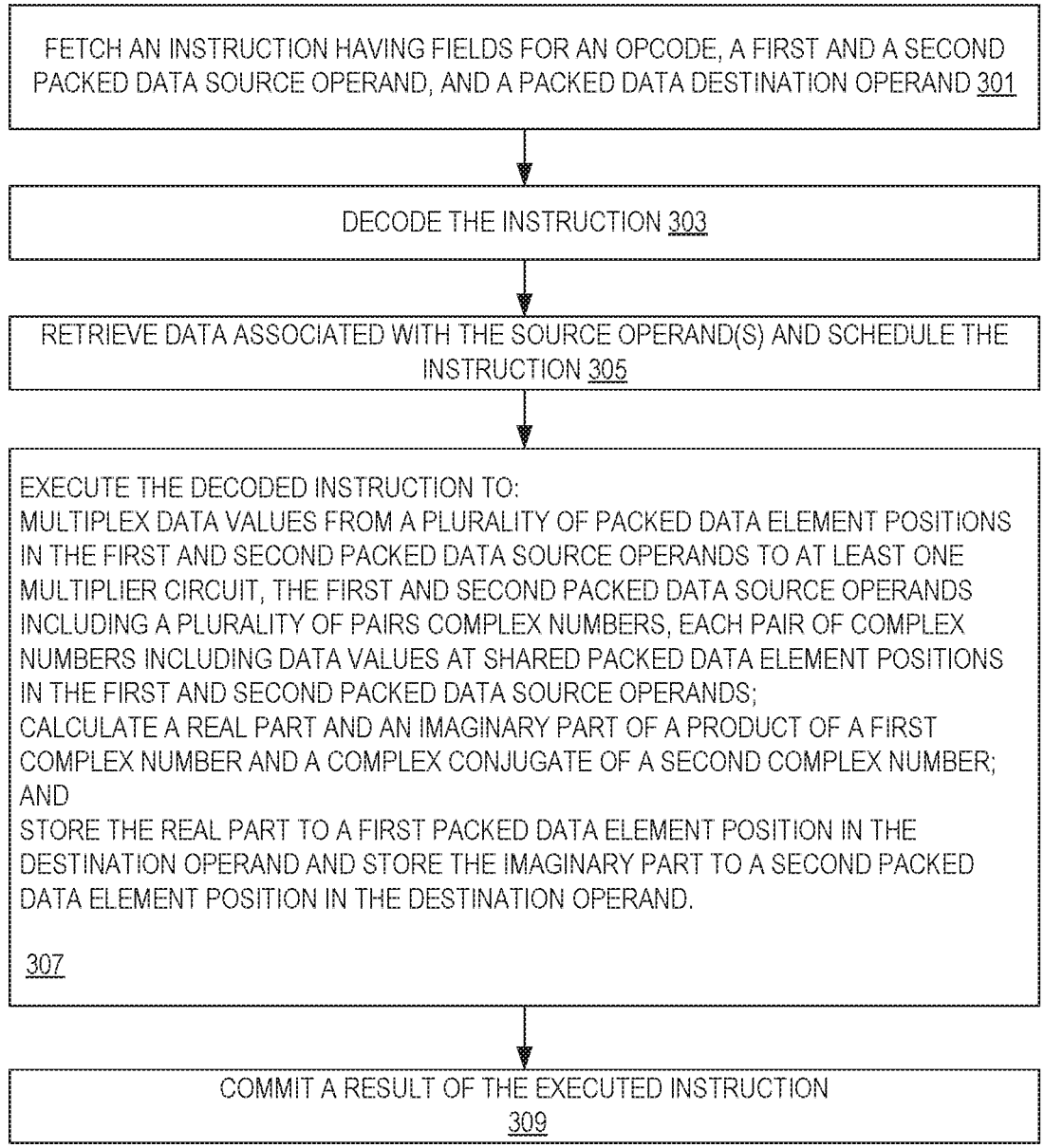
FIG. 3 illustrates an embodiment of a method performed by a processor to process a dual complex by complex conjugate multiply instruction.

FIG. 3 illustrates an embodiment of method performed by a processor to process a dual complex multiply add instruction. For example, the processor components of FIG. 3, a pipeline as detailed below, etc. performs this method.

At 301, an instruction is fetched. For example, dual complex multiply add of real parts instruction is fetched. The dual complex multiply add of real parts instruction includes fields for an opcode, a first and a second source operand, and a destination operand. In some embodiments, the instruction further includes a field for a writemask. In some embodiments, the instruction is fetched from an instruction cache. The source operands and destination operand can be vector packed data.

The fetched instruction is decoded at 303. For example, the fetched dual complex multiply add of real parts instruction is decoded by decode circuitry such as that detailed herein.

Data values associated with the source operands of the decoded instruction are retrieved at 305 and the decoded instruction is scheduled (as needed). For example, when one or more of the source operands are memory operands, the data from the indicated memory location is retrieved.

At 307, the decoded instruction is executed by execution circuitry (hardware) such as that detailed herein. For the dual complex by complex conjugate multiply instruction, the execution will cause execution circuitry to multiply a complex number in a first source data by the complex conjugate of a complex number in a second source data. In some embodiments, the execution of a decoded dual complex by complex conjugate multiply instruction causes an execution circuit to multiplex data values from a plurality of packed data element positions in the first and second packed data source operands to at least one multiplier circuit, the first and second packed data source operands including a plurality of pairs complex numbers, each pair of complex numbers including data values at shared packed data element positions in the first and second packed data source operands, calculate a real part of a product of a first complex number and the complex conjugate of a second complex number, and output the real part and the imaginary part of the product of each pair of complex numbers to an adder network to calculate the real result and the imaginary result, and store the real result to a first packed data element position in the destination operand and store the imaginary result to a second packed data element position in the destination operand.

In some embodiments, the instruction is committed or retired at 309.

Exemplary embodiments are detailed below.

1. An apparatus comprising: a decoder to decode an instruction having fields for a first and a second packed data source operand, and a packed data destination operand, and execution circuitry to execute the decoded instruction to: multiplex data values from a plurality of packed data element positions in the first and second packed data source operands to at least one multiplier circuit, the first and second packed data source operands including a plurality of pairs complex numbers, each pair of complex numbers including data values at shared packed data element positions in the first and second packed data source operands; calculate a real part and an imaginary part of a product of a first complex number and a complex conjugate of a second complex number; and store the real part to a first packed data element position in the destination operand and store the imaginary part to a second packed data element position in the destination operand.

2. The apparatus of example 1, wherein the first packed data source operand is a packed data register and the second packed data source operand is a memory location.

3. The apparatus of example 1, wherein the first packed data source operand is a packed data register and the second packed data source operand is a packed data register.

4. The apparatus of example 1, wherein to calculate a real part of a product of a first complex number and a complex conjugate of a second complex number the execution circuitry is further to: output the real part and the imaginary part of the product of each pair of complex numbers to an adder network to calculate a real result and an imaginary result.

5. The apparatus of example 1, wherein the packed data destination operand is a packed data register and the first packed data element position is a lower 16 bits of the packed data register and the second packed data element position is a next 16 bits of the packed data register.

6. The apparatus of example 1, wherein execution circuitry to execute the decoded instruction to further: round the real part of the product of the first complex number and the complex conjugate of the second complex number; and round the real part of the product of the first complex number and the complex conjugate of the second complex number.

7. The apparatus of example 6, wherein a rounding type for the real part and the imaginary part of the product is selected using one or more control bits.

8. The apparatus of example 7, wherein the rounding type includes at least one of truncation, convergent rounding, or round-up.

9. A method comprising: decoding an instruction having fields for a first and a second packed data source operand, and a packed data destination operand, and executing the decoded instruction, by execution circuitry, to: multiplex data values from a plurality of packed data element positions in the first and second packed data source operands to at least one multiplier circuit, the first and second packed data source operands including a plurality of pairs complex numbers, each pair of complex numbers including data values at shared packed data element positions in the first and second packed data source operands; calculate a real part and an imaginary part of a product of a first complex number and a complex conjugate of a second complex number; and store the real part to a first packed data element position in the destination operand and store the imaginary part to a second packed data element position in the destination operand.

10. The method of example 9, wherein the first packed data source operand is a packed data register and the second packed data source operand is a memory location.

11. The method of example 9, wherein the first packed data source operand is a packed data register and the second packed data source operand is a packed data register.

12. The method of example 9, wherein to calculate a real part of a product of a first complex number and a complex conjugate of a second complex number the execution circuitry is further to: output the real part and the imaginary part of the product of each pair of complex numbers to an adder network to calculate a real result and an imaginary result.

13. The method of example 9, wherein the packed data destination operand is a packed data register and the first packed data element position is a lower 16 bits of the packed data register and the second packed data element position is a next 16 bits of the packed data register.

14. The method of example 9, wherein executing the decoded instruction, by execution circuitry, is further to: round the real part of the product of the first complex number and the complex conjugate of the second complex number; and round the real part of the product of the first complex number and the complex conjugate of the second complex number.

15. The method of example 14, wherein a rounding type for the real part and the imaginary part of the product is selected using one or more control bits.

16. The method of example 15, wherein the rounding type includes at least one of truncation, convergent rounding, or round-up.

17. A non-transitory machine-readable medium storing an instruction which when executed by a processor causes the processor to perform a method, the method comprising: decoding an instruction having fields for a first and a second packed data source operand, and a packed data destination operand, and executing the decoded instruction, by execution circuitry, to: multiplex data values from a plurality of packed data element positions in the first and second packed data source operands to at least one multiplier circuit, the first and second packed data source operands including a plurality of pairs complex numbers, each pair of complex numbers including data values at shared packed data element positions in the first and second packed data source operands; calculate a real part and an imaginary part of a product of a first complex number and a complex conjugate of a second complex number; and store the real part to a first packed data element position in the destination operand and store the imaginary part to a second packed data element position in the destination operand.

18. The non-transitory machine-readable medium of example 17, wherein the first packed data source operand is a packed data register and the second packed data source operand is a memory location.

19. The non-transitory machine-readable medium of example 17, wherein the first packed data source operand is a packed data register and the second packed data source operand is a packed data register.

20. The non-transitory machine-readable medium of example 17, wherein to calculate a real part of a product of a first complex number and a complex conjugate of a second complex number the execution circuitry is further to: output the real part and the imaginary part of the product of each pair of complex numbers to an adder network to calculate a real result and an imaginary result.

21. The non-transitory machine-readable medium of example 17, wherein the packed data destination operand is a packed data register and the first packed data element position is a lower 16 bits of the packed data register and the second packed data element position is a next 16 bits of the packed data register.

22. The non-transitory machine-readable medium of example 17, wherein executing the decoded instruction, by execution circuitry, is further to: round the real part of the product of the first complex number and the complex conjugate of the second complex number; and round the real part of the product of the first complex number and the complex conjugate of the second complex number.

23. The non-transitory machine-readable medium of example 22, wherein a rounding type for the real part and the imaginary part of the product is selected using one or more control bits.

24. The non-transitory machine-readable medium of example 23, wherein the rounding type includes at least one of truncation, convergent rounding, or round-up.

Detailed below are exemplary instruction formats, architectures, and systems that may be utilized for the above detailed instructions. For example, an exemplary pipeline supporting the instructions is detailed that includes circuitry to perform the methods detailed herein.

Instruction Sets

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source 1/destination and source 2); and an occurrence of this ADD instruction in an instruction stream will have specific contents in the operand fields that select specific operands.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 128 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 4A illustrates an exemplary AVX instruction format including a VEX prefix 402, real opcode field 430, Mod R/M byte 440, SIB byte 450, displacement field 462, and IMM8 472. FIG. 4B illustrates which fields from FIG. 4 make up a full opcode field 474 and a base operation field 441. FIG. 4C illustrates which fields from FIG. 4A make up a register index field 444.

VEX Prefix (Bytes 0-2) 402 is encoded in a three-byte form. The first byte is the Format Field 490 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 405 (VEX Byte 1, bits [7-5]) consists of a VEX.R bit field (VEX Byte 1, bit [7]—R), VEX.X bit field (VEX byte 1, bit [6]—X), and VEX.B bit field (VEX byte 1, bit[5]—B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 415 (VEX byte 1, bits [4:0]—mmmmm) includes content to encode an implied leading opcode byte. W Field 464 (VEX byte 2, bit [7]—W)—is represented by the notation VEX.W, and provides different functions depending on the instruction. The role of VEX.vvvv 420 (VEX Byte 2, bits [6:3]—vvvv) may include the following: 1) VEX.vvvv encodes the first source register operand, specified in inverted (1s complement) form and is valid for instructions with 2 or more source operands; 2) VEX.vvvv encodes the destination register operand, specified in is complement form for certain vector shifts; or 3) VEX.vvvv does not encode any operand, the field is reserved and should contain 1111b. If VEX.L 468 Size field (VEX byte 2, bit [2]—L)=0, it indicates 128 bit vector; if VEX.L=1, it indicates 256 bit vector. Prefix encoding field 425 (VEX byte 2, bits [1:0]-pp) provides additional bits for the base operation field 441.

Real Opcode Field 430 (Byte 3) is also known as the opcode byte. Part of the opcode is specified in this field.

MOD R/M Field 440 (Byte 4) includes MOD field 442 (bits [7-6]), Reg field 444 (bits [5-3]), and R/M field 446 (bits [2-0]). The role of Reg field 444 may include the following: encoding either the destination register operand or a source register operand (the rrr of Rrrr), or be treated as an opcode extension and not used to encode any instruction operand. The role of R/M field 446 may include the following: encoding the instruction operand that references a memory address, or encoding either the destination register operand or a source register operand.

Scale, Index, Base (SIB)—The content of Scale field 450 (Byte 5) includes SS 452 (bits [7-6]), which is used for memory address generation. The contents of SIB.xxx 454 (bits [5-3]) and SIB.bbb 456 (bits [2-0]) have been previously referred to with regard to the register indexes Xxxx and Bbbb.

The Displacement Field 462 and the immediate field (IMM8) 472 contain data.

Exemplary Register Architecture

FIG. 5 is a block diagram of a register architecture 500 according to one embodiment of the invention. In the embodiment illustrated, there are 32 vector registers 510 that are 512 bits wide; these registers are referenced as zmm0 through zmm31. The lower order 256 bits of the lower 16 zmm registers are overlaid on registers ymm0-15. The lower order 128 bits of the lower 11 zmm registers (the lower order 128 bits of the ymm registers) are overlaid on registers xmm0-15.

General-purpose registers 525—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 545, on which is aliased the MMX packed integer flat register file 550—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

Exemplary Core Architectures

In-Order and Out-of-Order Core Block Diagram

FIG. 6A is a block diagram illustrating both an exemplary in-order pipeline and an exemplary register renaming, out-of-order issue/execution pipeline according to embodiments of the invention. FIG. 6B is a block diagram illustrating both an exemplary embodiment of an in-order architecture core and an exemplary register renaming, out-of-order issue/execution architecture core to be included in a processor according to embodiments of the invention. The solid lined boxes in FIGS. 6A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

FIG. 6B shows processor core 690 including a front end unit 630 coupled to an execution engine unit 650, and both are coupled to a memory unit 670. The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, coprocessor core, general purpose computing graphics processing unit (GPGPU) core, graphics core, or the like.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 690 includes a microcode ROM or other medium that stores microcode for certain macroinstructions (e.g., in decode unit 640 or otherwise within the front end unit 630). The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations, central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 658 comprises a vector registers unit and a scalar registers unit. These register units may provide architectural vector registers, vector mask registers, and general purpose registers. The physical register file(s) unit(s) 658 is overlapped by the retirement unit 654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary embodiment, the memory access units 664 may include a load unit, a store address unit, and a store data unit, each of which is coupled to the data TLB unit 672 in the memory unit 670. The instruction cache unit 634 is further coupled to a level 2 (L2) cache unit 676 in the memory unit 670. The L2 cache unit 676 is coupled to one or more other levels of cache and eventually to a main memory.

By way of example, the exemplary register renaming, out-of-order issue/execution core architecture may implement the pipeline 600 as follows: 1) the instruction fetch 638 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618; 7) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 634/674 and a shared L2 cache unit 676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

Figure 7B:
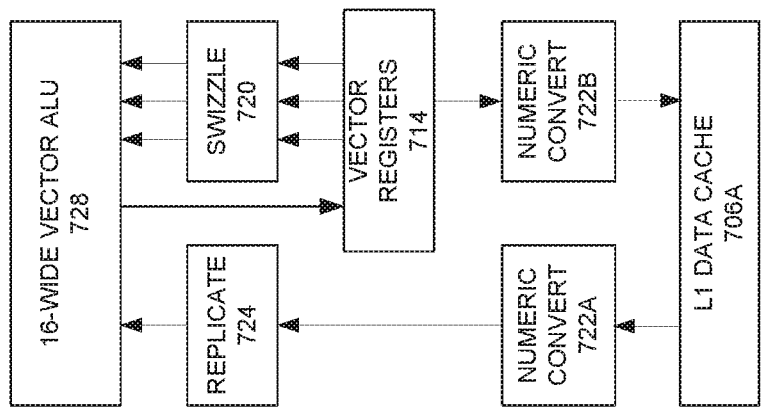
FIGS. 7A-B illustrate a block diagram of a more specific exemplary in-order core architecture, which core would be one of several logic blocks (including other cores of the same type and/or different types) in a chip.
Figure 7A:
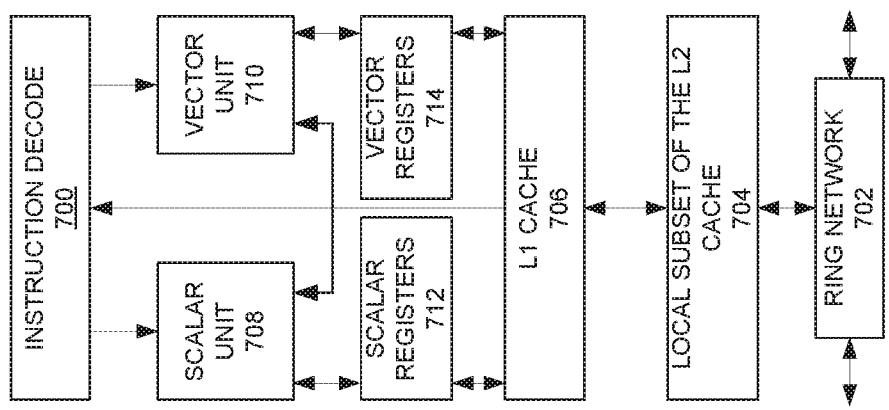

FIG. 7A is a block diagram of a single processor core, along with its connection to the on-die interconnect network 702 and with its local subset of the Level 2 (L2) cache 704, according to embodiments of the invention. In one embodiment, an instruction decoder 700 supports the x86 instruction set with a packed data instruction set extension. An L1 cache 706 allows low-latency accesses to cache memory into the scalar and vector units. While in one embodiment (to simplify the design), a scalar unit 708 and a vector unit 710 use separate register sets (respectively, scalar registers 712 and vector registers 714) and data transferred between them is written to memory and then read back in from a level 1 (L1) cache 706, alternative embodiments of the invention may use a different approach (e.g., use a single register set or include a communication path that allow data to be transferred between the two register files without being written and read back).

The local subset of the L2 cache 704 is part of a global L2 cache that is divided into separate local subsets, one per processor core. Each processor core has a direct access path to its own local subset of the L2 cache 704. Data read by a processor core is stored in its L2 cache subset 704 and can be accessed quickly, in parallel with other processor cores accessing their own local L2 cache subsets. Data written by a processor core is stored in its own L2 cache subset 704 and is flushed from other subsets, if necessary. The ring network ensures coherency for shared data. The ring network is bi-directional to allow agents such as processor cores, L2 caches and other logic blocks to communicate with each other within the chip. Each ring data-path is 724-bits wide per direction in some embodiments.

FIG. 7B is an expanded view of part of the processor core in FIG. 7A according to embodiments of the invention. FIG. 7B includes an L1 data cache 706A part of the L1 cache 704, as well as more detail regarding the vector unit 710 and the vector registers 714. Specifically, the vector unit 710 is a 11-wide vector processing unit (VPU) (see the 16-wide ALU 728), which executes one or more of integer, single-precision float, and double-precision float instructions. The VPU supports swizzling the register inputs with swizzle unit 720, numeric conversion with numeric convert units 722A-B, and replication with replication unit 724 on the memory input.

Processor with Integrated Memory Controller and Graphics

Figure 8:
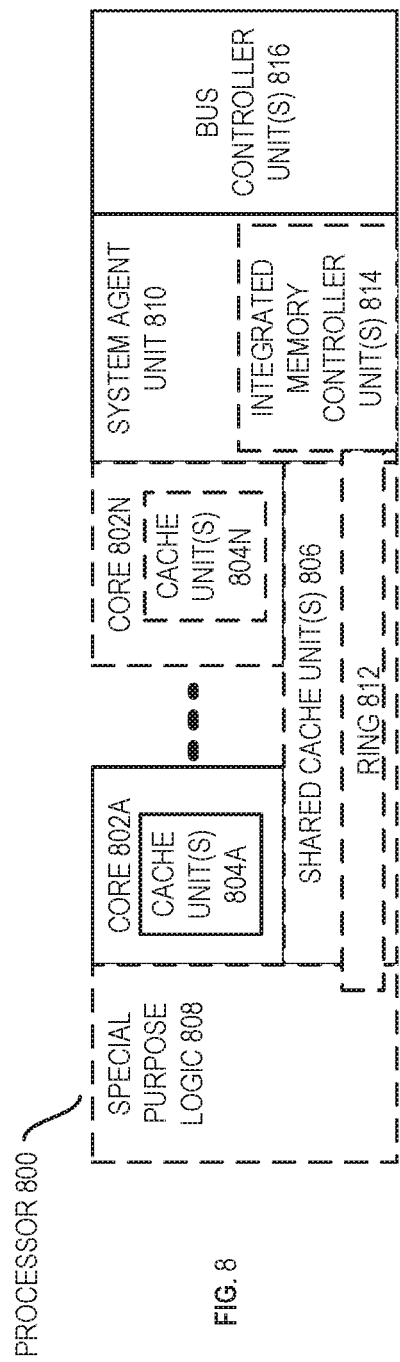
FIG. 8 is a block diagram of a processor that may have more than one core, may have an integrated memory controller, and may have integrated graphics according to embodiments of the invention.

FIG. 8 is a block diagram of a processor 800 that may have more than one core, may have an integrated memory controller, and may have integrated graphics according to embodiments of the invention. The solid lined boxes in FIG. 8 illustrate a processor 800 with a single core 802A, a system agent 810, a set of one or more bus controller units 816, while the optional addition of the dashed lined boxes illustrates an alternative processor 800 with multiple cores 802A-N, a set of one or more integrated memory controller unit(s) 814 in the system agent unit 810, and special purpose logic 808.

Thus, different implementations of the processor 800 may include: 1) a CPU with the special purpose logic 808 being integrated graphics and/or scientific (throughput) logic (which may include one or more cores), and the cores 802A-N being one or more general purpose cores (e.g., general purpose in-order cores, general purpose out-of-order cores, a combination of the two); 2) a coprocessor with the cores 802A-N being a large number of special purpose cores intended primarily for graphics and/or scientific (throughput); and 3) a coprocessor with the cores 802A-N being a large number of general purpose in-order cores. Thus, the processor 800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 800 may be a part of and/or may be implemented on one or more substrates using any of a number of process technologies, such as, for example, BiCMOS, CMOS, or NMOS.

The memory hierarchy includes one or more levels of cache within the cores 804A-N, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. While in one embodiment a ring based interconnect unit 812 interconnects the integrated graphics logic 808, the set of shared cache units 806, and the system agent unit 810/integrated memory controller unit(s) 814, alternative embodiments may use any number of well-known techniques for interconnecting such units. In one embodiment, coherency is maintained between one or more cache units 806 and cores 802-A-N.

In some embodiments, one or more of the cores 802A-N are capable of multithreading. The system agent 810 includes those components coordinating and operating cores 802A-N. The system agent unit 810 may include for example a power control unit (PCU) and a display unit. The PCU may be or include logic and components needed for regulating the power state of the cores 802A-N and the integrated graphics logic 808. The display unit is for driving one or more externally connected displays.

The cores 802A-N may be homogenous or heterogeneous in terms of architecture instruction set; that is, two or more of the cores 802A-N may be capable of execution the same instruction set, while others may be capable of executing only a subset of that instruction set or a different instruction set.

Exemplary Computer Architectures

FIGS. 9-12 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 9:
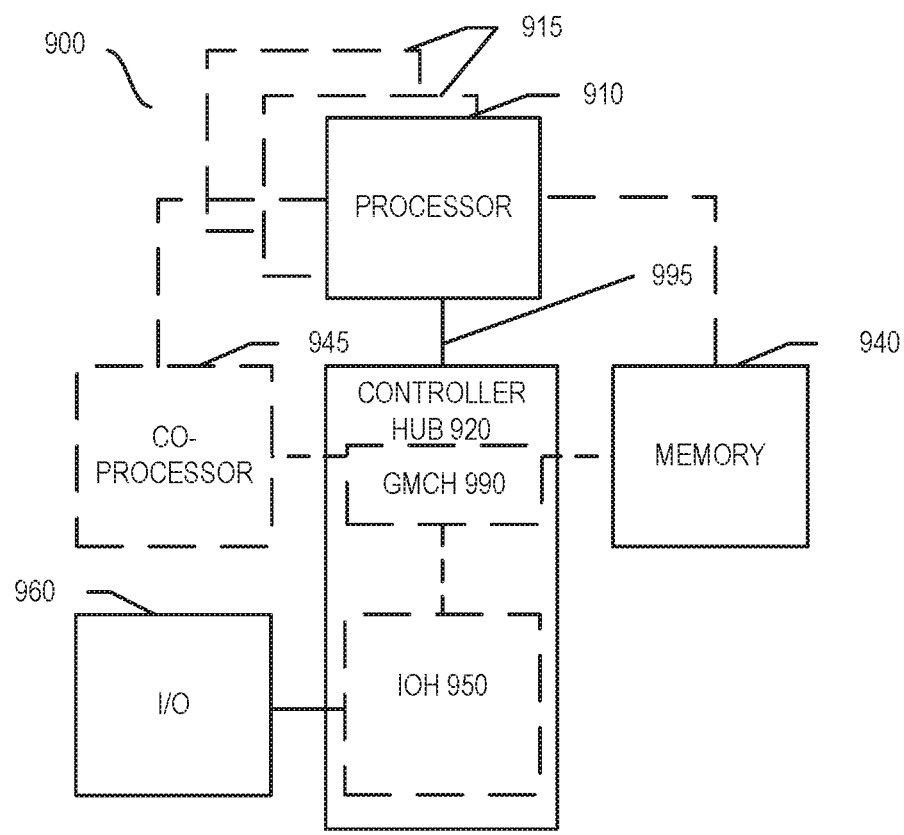
FIG. 9 shown a block diagram of a system in accordance with one embodiment of the present invention.

Referring now to FIG. 9, shown is a block diagram of a system 900 in accordance with one embodiment of the present invention. The system 900 may include one or more processors 910, 915, which are coupled to a controller hub 920. In one embodiment, the controller hub 920 includes a graphics memory controller hub (GMCH) 990 and an Input/

Output Hub (IOH) 950 (which may be on separate chips); the GMCH 990 includes memory and graphics controllers to which are coupled memory 940 and a coprocessor 945; the IOH 950 is couples input/output (I/O) devices 960 to the GMCH 990. Alternatively, one or both of the memory and graphics controllers are integrated within the processor (as described herein), the memory 940 and the coprocessor 945 are coupled directly to the processor 910, and the controller hub 920 in a single chip with the IOH 950.

The optional nature of additional processors 915 is denoted in FIG. 9 with broken lines. Each processor 910, 915 may include one or more of the processing cores described herein and may be some version of the processor 900.

The memory 940 may be, for example, dynamic random access memory (DRAM), phase change memory (PCM), or a combination of the two. For at least one embodiment, the controller hub 920 communicates with the processor(s) 910, 915 via a multi-drop bus, such as a frontside bus (FSB), point-to-point interface, or similar connection 995.

In one embodiment, the coprocessor 945 is a special-purpose processor, such as, for example, a high-throughput MIC processor, a network or communication processor, compression engine, graphics processor, GPGPU, embedded processor, or the like. In one embodiment, controller hub 920 may include an integrated graphics accelerator.

There can be a variety of differences between the physical resources 910, 915 in terms of a spectrum of metrics of merit including architectural, microarchitectural, thermal, power consumption characteristics, and the like.

In one embodiment, the processor 910 executes instructions that control data processing operations of a general type. Embedded within the instructions may be coprocessor instructions. The processor 910 recognizes these coprocessor instructions as being of a type that should be executed by the attached coprocessor 945. Accordingly, the processor 910 issues these coprocessor instructions (or control signals representing coprocessor instructions) on a coprocessor bus or other interconnect, to coprocessor 945. Coprocessor(s) 945 accept and execute the received coprocessor instructions.

Figure 10:
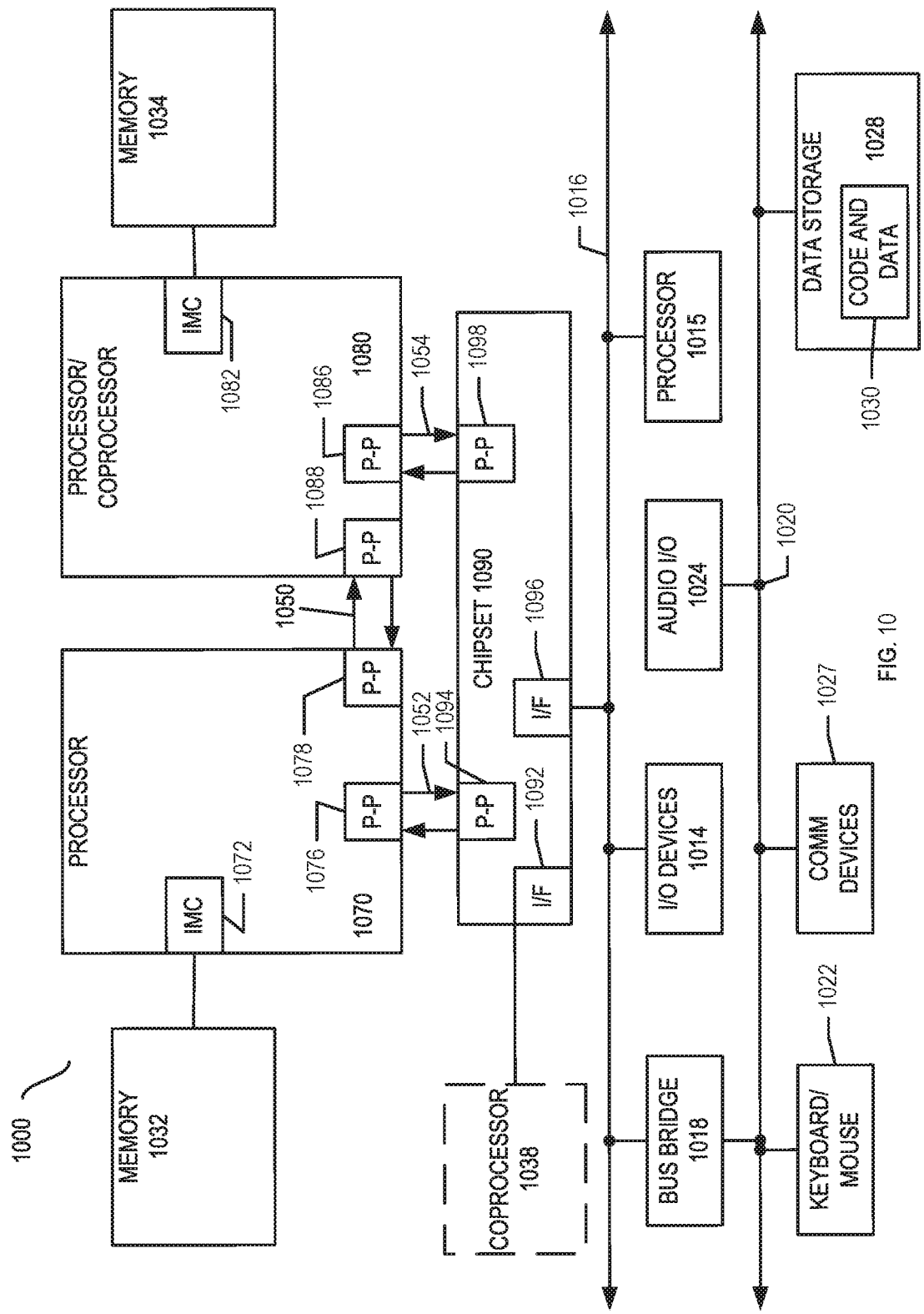
FIG. 10 is a block diagram of a first more specific exemplary system in accordance with an embodiment of the present invention.

Referring now to FIG. 10, shown is a block diagram of a first more specific exemplary system 1000 in accordance with an embodiment of the present invention. As shown in FIG. 10, multiprocessor system 1000 is a point-to-point interconnect system, and includes a first processor 1070 and a second processor 1080 coupled via a point-to-point interconnect 1050. Each of processors 1070 and 1080 may be some version of the processor 800. In one embodiment of the invention, processors 1070 and 1080 are respectively processors 910 and 915, while coprocessor 1038 is coprocessor 945. In another embodiment, processors 1070 and 1080 are respectively processor 910 coprocessor 945.

Processors 1070 and 1080 are shown including integrated memory controller (IMC) units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may optionally exchange information with the coprocessor 1038 via a high-performance interface 1092. In one embodiment, the coprocessor 1038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another I/O interconnect bus, although the scope of the present invention is not so limited.

As shown in FIG. 10, various I/O devices 1014 may be coupled to first bus 1016, along with a bus bridge 1018 which couples first bus 1016 to a second bus 1020. In one embodiment, one or more additional processor(s) 1015, such as coprocessors, high-throughput MIC processors, GPGPU's, accelerators (such as, e.g., graphics accelerators or digital signal processing (DSP) units), field programmable gate arrays, or any other processor, are coupled to first bus 1016. In one embodiment, second bus 1020 may be a low pin count (LPC) bus. Various devices may be coupled to a second bus 1020 including, for example, a keyboard and/or mouse 1022, communication devices 1027 and a storage unit 1028 such as a disk drive or other mass storage device which may include instructions/code and data 1030, in one embodiment. Further, an audio I/O 1024 may be coupled to the second bus 1016. Note that other architectures are possible. For example, instead of the point-to-point architecture of FIG. 10, a system may implement a multi-drop bus or other such architecture.

Figure 11:
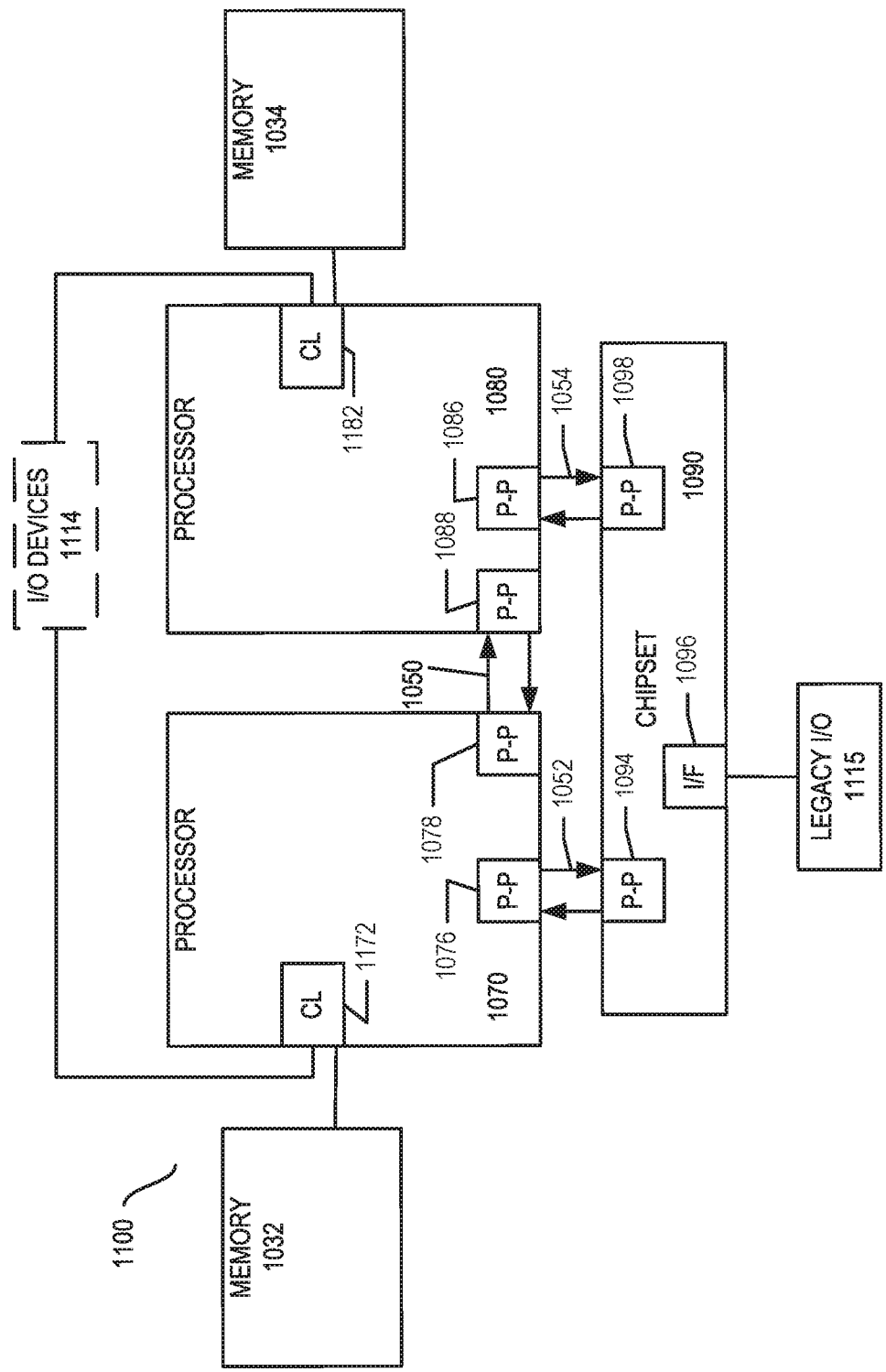
FIG. 11 is a block diagram of a second more specific exemplary system in accordance with an embodiment of the present invention.

Referring now to FIG. 11, shown is a block diagram of a second more specific exemplary system 1100 in accordance with an embodiment of the present invention. Like elements in FIGS. 10 and 11 bear like reference numerals, and certain aspects of FIG. 10 have been omitted from FIG. 11 in order to avoid obscuring other aspects of FIG. 11.

FIG. 11 illustrates that the processors 1070, 1080 may include integrated memory and I/O control logic ("CL") 1172 and 1182, respectively. Thus, the CL 1172, 1182 include integrated memory controller units and include I/O control logic. FIG. 11 illustrates that not only are the memories 1032, 1034 coupled to the CL 1072, 1082, but also that I/O devices 1114 are also coupled to the control logic 1072, 1082. Legacy I/O devices 1115 are coupled to the chipset 1090.

Figure 12:
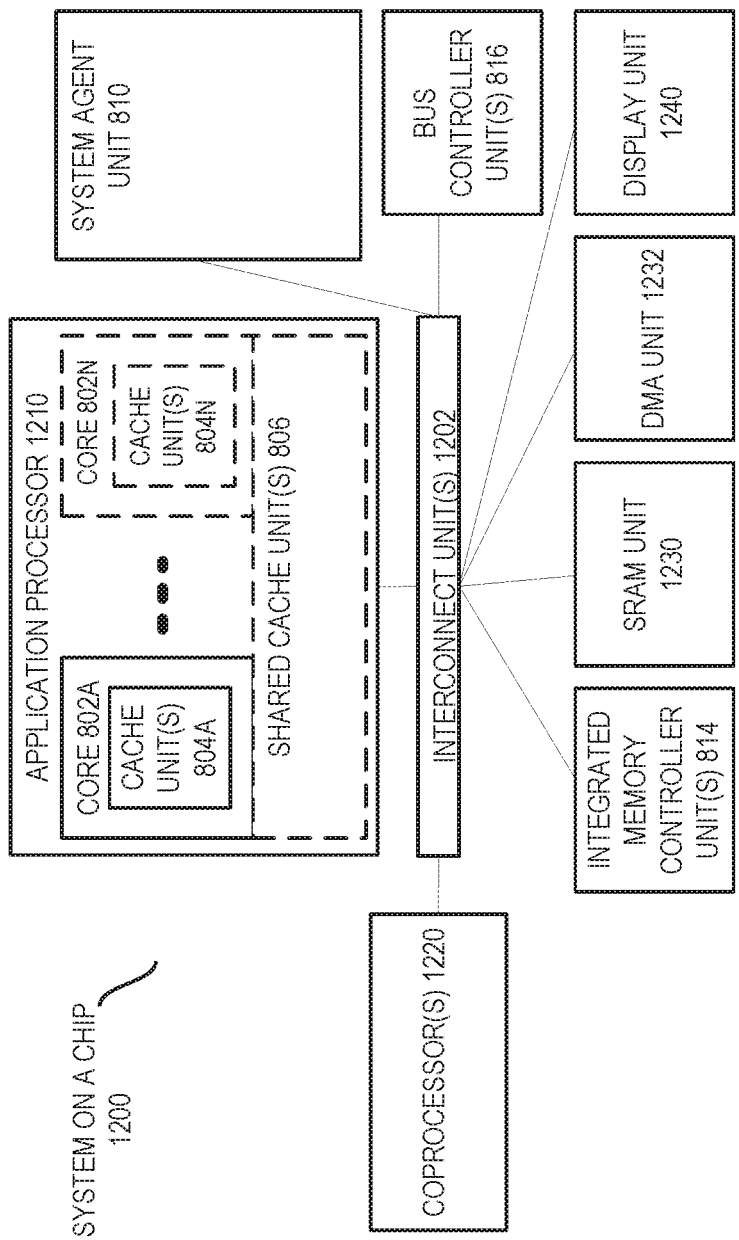
FIG. 12 is a block diagram of a SoC in accordance with an embodiment of the present invention.

Referring now to FIG. 12, shown is a block diagram of a SoC 1200 in accordance with an embodiment of the present invention. Similar elements in FIG. 8 bear like reference numerals. Also, dashed lined boxes are optional features on more advanced SoCs. In FIG. 12, an interconnect unit(s) 1202 is coupled to: an application processor 1210 which includes a set of one or more cores 1220A-N, cache units 804A-N, and shared cache unit(s) 806; a system agent unit 810; a bus controller unit(s) 816; an integrated memory controller unit(s) 814; a set or one or more coprocessors 1220 which may include integrated graphics logic, an image processor, an audio processor, and a video processor; an static random access memory (SRAM) unit 1230; a direct memory access (DMA) unit 1232; and a display unit 1240 for coupling to one or more external displays. In one embodiment, the coprocessor(s) 1220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1030 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an first compiler 1304 to generate a first binary code (e.g., x86) 1306 that may be natively executed by a processor with at least one first instruction set core 1316. In some embodiments, the processor with at least one first instruction set core 1316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The first compiler 1304 represents a compiler that is operable to generate binary code of the first instruction set 1306 (e.g., object code) that can, with or without additional linkage processing, be executed on the processor with at least one first instruction set core 1316. Similarly, FIG. 13 shows the program in the high level language 1302 may be compiled using an alternative instruction set compiler 1308 to generate alternative instruction set binary code 1310 that may be natively executed by a processor without at least one first instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1312 is used to convert the first binary code 1306 into code that may be natively executed by the processor without an first instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have a first instruction set processor or core to execute the first binary code 1306.

What is claimed is:

1. An apparatus comprising:
   a decoder to decode an instruction having fields for a first and a second packed data source operand, and a packed data destination operand, and
   execution circuitry to execute the decoded instruction to:
   multiplex data values from a plurality of packed data element positions in the first and second packed data source operands to at least one multiplier circuit, the first packed data source operand including a first plurality of complex numbers and the second packed data source operand including a second plurality of complex numbers, wherein the first plurality of complex numbers and second plurality of complex numbers comprise a plurality of pairs of complex numbers, wherein each complex number from the first plurality of complex numbers is paired with a corresponding complex number from the second plurality of complex numbers having shared packed data element positions in the first and second packed data source operands;

for each pair of complex numbers:
calculate a real part and an imaginary part of a product of a first complex number and a complex conjugate of a second complex number;
store the real part to a first packed data element position in the destination operand and store the imaginary part to a second packed data element position in the destination operand;
round the real part of the product of the first complex number and the complex conjugate of the second complex number based on a rounding type; and
round the imaginary part of the product of the first complex number and the complex conjugate of the second complex number based on the rounding type, wherein the rounding type for the real part and the imaginary part of the product is selected using a plurality of control bits, the rounding type including truncation or convergent rounding.

2. The apparatus of claim 1, wherein the first packed data source operand is a packed data register and the second packed data source operand is a memory location.

3. The apparatus of claim 1, wherein the first packed data source operand is a packed data register and the second packed data source operand is a packed data register.

4. The apparatus of claim 1, wherein to calculate a real part of a product of a first complex number and a complex conjugate of a second complex number the execution circuitry is further to:
output the real part and the imaginary part of the product of each pair of complex numbers to an adder network to calculate a real result and an imaginary result.

5. The apparatus of claim 1, wherein the packed data destination operand is a packed data register and the first packed data element position is a lower 16 bits of the packed data register and the second packed data element position is a next 16 bits of the packed data register.

6. A method comprising:
decoding an instruction having fields for a first and a second packed data source operand, and a packed data destination operand, and
executing the decoded instruction, by execution circuitry, to:
multiplex data values from a plurality of packed data element positions in the first and second packed data source operands to at least one multiplier circuit, the first packed data source operand including a first plurality of complex numbers and the second packed data source operand including a second plurality of complex numbers, wherein the first plurality of complex numbers and second plurality of complex numbers comprise a plurality of pairs of complex numbers, wherein each complex number from the first plurality of complex numbers is paired with a corresponding complex number from the second plurality of complex numbers having shared packed data element positions in the first and second packed data source operands;

for each pair of complex numbers:
calculate a real part and an imaginary part of a product of a first complex number and a complex conjugate of a second complex number;
store the real part to a first packed data element position in the destination operand and store the imaginary part to a second packed data element position in the destination operand;
round the real part of the product of the first complex number and the complex conjugate of the second complex number based on a rounding type; and
round the imaginary part of the product of the first complex number and the complex conjugate of the second complex number based on the rounding type, wherein the rounding type for the real part and the imaginary part of the product is selected using a plurality of control bits, the rounding type including truncation or convergent rounding.

7. The method of claim 6, wherein the first packed data source operand is a packed data register and the second packed data source operand is a memory location.

8. The method of claim 6, wherein the first packed data source operand is a packed data register and the second packed data source operand is a packed data register.

9. The method of claim 6, wherein to calculate a real part of a product of a first complex number and a complex conjugate of a second complex number the execution circuitry is further to:
output the real part and the imaginary part of the product of each pair of complex numbers to an adder network to calculate a real result and an imaginary result.

10. The method of claim 6, wherein the packed data destination operand is a packed data register and the first packed data element position is a lower 16 bits of the packed data register and the second packed data element position is a next 16 bits of the packed data register.

11. A non-transitory machine-readable medium storing an instruction which when executed by a processor causes the processor to perform a method, the method comprising:
decoding an instruction having fields for a first and a second packed data source operand, and a packed data destination operand, and
executing the decoded instruction, by execution circuitry, to:
multiplex data values from a plurality of packed data element positions in the first and second packed data source operands to at least one multiplier circuit, the first packed data source operand including a first plurality of complex numbers and the second packed data source operand including a second plurality of complex numbers, wherein the first plurality of complex numbers and second plurality of complex numbers comprise a plurality of pairs of complex numbers, wherein each complex number from the first plurality of complex numbers is paired with a corresponding complex number from the second plurality of complex numbers having shared packed data element positions in the first and second packed data source operands;

for each pair of complex numbers:
calculate a real part and an imaginary part of a product of a first complex number and a complex conjugate of a second complex number;

store the real part to a first packed data element position in the destination operand and store the imaginary part to a second packed data element position in the destination operand;

round the real part of the product of the first complex number and the complex conjugate of the second complex number based on a rounding type; and round the imaginary part of the product of the first complex number and the complex conjugate of the second complex number based on the rounding type, wherein the rounding type for the real part and the imaginary part of the product is selected using a plurality of control bits, the rounding type including truncation or convergent rounding.

12. The non-transitory machine-readable medium of claim 11, wherein the first packed data source operand is a packed data register and the second packed data source operand is a memory location.

13. The non-transitory machine-readable medium of claim 11, wherein the first packed data source operand is a packed data register and the second packed data source operand is a packed data register.

14. The non-transitory machine-readable medium of claim 11, wherein to calculate a real part of a product of a first complex number and a complex conjugate of a second complex number the execution circuitry is further to:

output the real part and the imaginary part of the product of each pair of complex numbers to an adder network to calculate a real result and an imaginary result.

* * * * *